UNITED STATES PATENT OFFICE.

JOHN M. JOLLY, OF MARLIN, TEXAS.

LEATHER-DRESSING.

SPECIFICATION forming part of Letters Patent No. 441,010, dated November 18, 1890.

Application filed August 22, 1890. Serial No. 362,772. (No specimens.)

*To all whom it may concern:*

Be it known that I, JOHN M. JOLLY, of Marlin, in the county of Falls and State of Texas, have invented a new and useful Improvement in Leather-Dressing and Leather-Preserving Compounds, of which the following is a full, clear, and exact description.

The invention relates to an improved composition of matter for the stuffing or filling of leather and to soften and polish the same, and also to preserve the leather, and is particularly applicable as a dressing for harness, boots, shoes, and all leather exposed to the weather.

My composition consists of the following ingredients, combined in the proportions stated: Neat's-foot oil, one quart; water, one quart; beeswax, one-half pound; logwood, (extract,) one-half pound; gum-arabic, one ounce; petrolatum, two ounces; borax, two ounces; oil of citronella, one ounce; castile-soap, three pounds. Mix the ingredients in the proportions named and gradually apply heat until the mass is brought to the boiling-point. When cooled, it is ready for use.

Having given the relative proportion of materials preferably used in my composition, what I claim as new, and desire to secure by Letters Patent, is—

The herein-described composition of matter to be used as a leather-dressing, consisting of neat's-foot oil, water, beeswax, extract of logwood, gum-arabic, petrolatum, borax, oil of citronella, and castile-soap, mixed in the proportions named.

JOHN M. JOLLY.

Witnesses:
F. A. COOLEY,
C. G. COOLEY.